United States Patent Office 3,790,629
Patented Feb. 5, 1974

3,790,629
PROCESS FOR PREPARING ALKYL OR ARYL THIOPHOSPHORUS HALIDES AND MIXED ISOMERS THEREOF
Eugene Henry Uhing, Ridgewood, N.J., and Arthur Dock Fon Toy, Stamford, Conn., assignors to Stauffer Chemical Company, New York, N.Y.
No Drawing. Filed Feb. 18, 1972, Ser. No. 227,616
Int. Cl. C07f 9/42
U.S. Cl. 260—543 P    9 Claims

ABSTRACT OF THE DISCLOSURE

Alkyl or aryl phosphonothioic dihalides and phosphinothioic monohalides are prepared by reacting an aliphatic or aromatic hydrocarbon respectively with a pentavalent thiophosphorus compound having at least two halogens attached thereto, and preferably three halogens, i.e. thiophosphoryl halide under at least autogenous pressure at a temperature of from 200° C. to 450° C. The compounds obtained are useful as constituents in insecticides, fungicides, pharmaceuticals, and as intermediates in preparation of other organophophorus compounds.

SPECIFICATION

The present invention relates to a new and improved process for the preparation of alkyl or aryl phosphonothioic dihalides, and phosphinothioic monohalides.

BACKGROUND OF THE INVENTION

Alkyl phosphonothioic dihalides have been prepared in the prior art by reacting alkyl halides with phosphorus trihalides in the presence of aluminum chloride, followed by sulfurization of the reaction product. The alkyl halide/phosphorus trihalide reaction proceeds at room temperature according to the formula set forth in Heuben-Weyl, Methoden der Organis Chenchemie at vol. 12, part 1 (1965) at p. 396:

(I)  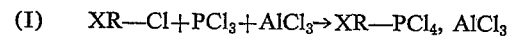

The Heuben-Weyl reference also notes that the reaction has been attempted in the absence of the aluminum chloride catalyst with little success. The reaction has the disadvantage that one mole of aluminum chloride is lost for each mole of product prepared.

The reaction product must be sulfurized to obtain the phosphonothioic dihalide product. A. M. Kinnear and E. A. Perren, Journal Chem. Soc., 3437 (1952) showed that $(EtPCl_3)(AlCl_4)$ can be sulfurized with $H_2S$. It gave a yield of only 32% $EtP(S)Cl_2$ while obtaining a 47% yield of a by-product $EtPS_2$. Alkyl or aryl phosphorus dichloride can also be converted to $RP(S)Cl_2$ by heating with sulfur.

Cycloalkanephosphonothioic dichlorides have also been prepared by reacting a cycloalkane with thiophosphoryl chloride under irradiation with mercury lamps. Reaction times are long and low yields are reported (Angew. Chem. Internat. Edit., vol. 9 (1970), No. 6 at p. 458).

THE INVENTION

In accordance with the present invention there is provided a new method for preparing compounds of the formula:

(II) 

wherein R is a $C_1$ to $C_{20}$ alkyl radical, cycloalkyl of 5–6 carbons in the ring, and the $C_1$–$C_4$ substituted derivative, an aralkyl radical of up to 2 fused rings, the alkyl portion having from 1 to 20 carbons, an aryl radical of up to 3 fused rings, and the $C_1$–$C_4$ alkyl derivatives thereof, or biphenylyl and the $C_1$–$C_4$ substituted derivatives thereof, X is a halogen of chlorine or bromine, and Z represents groups as defined under R and X above. The method comprises reacting an aliphatic or aromatic hydrocarbon of the formula:

(III)    RH with a thiophosphorus compound of the formula:

(IV)    $ZP(S)X_2$ wherein R, Z, and X are as defined above. The reaction is conducted at a temperature of from about 200° C. to about 450° C. under at least autogenous pressure. When Z equals X, the phosphonothioic compound is formed. When Z equals R, the phosphinothioic compounds are formed. The process of the present invention requires no separate catalyst in order to effect reaction. The preferred phosphorus reactant is the chloro compound. The preferred hydrocarbon is an aliphatic hydrocarbon. The preferred system uses thiophosphoryl chloride. Some of the dihalide products are known and have utility as chemical intermediates—particularly in the preparation of insecticides, fungicides, pharmaceuticals, and other organophosphorus compounds.

In Formula II, X is halogen of chlorine or bromine, preferably chlorine. For most intermediate type reactions, chlorine is preferred as it is inexpensive and reacts readily. Bromine, though equivalent to chlorine, is more expensive and can be used with facility if desired, particularly for special purposes, e.g., in the preparation of the bromine containing intermediates for flame retardant compounds. Basically, and for practical purposes, chlorine in the preferred entity.

In Formula II, R can be a $C_1$ to $C_{20}$ alkyl group and preferably the $C_1$ to $C_6$ alkyl group. The R group is also intended to include the aryl (1 or 2 fused rings) substituted derivatives of the alkyl groups, i.e., aralkyl, or any other modifications of the alkyl radical with non-interfering substituents. The alkyl groups are represented by methyl, ethyl, n-propyl, and isopropyl, n-butyl, isobutyl, and tert-butyl, as well as pentyl, hexyl, heptyl, octyl, nonyl, decyl, dodecyl, tetradecyl, hexadecyl, octodecyl, and eicosyl. The aralkyl groups are represented by phenylmethyl, phenylethyl, phenylbutyl, phenyloctyl, phenylhexadecyl, and the corresponding naphthyl derivatives.

R can also be cycloalkyl or 5–6 carbons in the ring and the $C_1$–$C_4$ alkyl substituted derivatives thereof. These ring systems are illustrated by cyclopentyl and cyclohexyl and its derivatives.

R can also be an aryl of up to an including 3 fused rings. These aromatic compounds include the benzene series of ring compounds the naphthalene series of compounds as well as the anthracene series and preferably those of the benzene series. Included within each series are those compounds wherein the ring hydrogens are substituted with non-interfering groups. Some of these non-interfering groups can be illustrated by the $C_1$ to $C_4$ alkyl derivatives (alkaryl) which are given only as illustrative of the many equivalent groups which could be used by one skilled in the art. These radicals can be illustrated by phenyl, methylphenyl, i.e. (tolyl), ethylphenyl, propylphenyl, and butylphenyl, naphthyl, methylnaphthyl, ethylnaphthyl, propylnaphthyl, butylnaphthyl, anthryl, methylanthryl, propylanthryl, butylanthryl, as well as mixed forms thereof such as dimethyl phenyl, dimethylnaphthyl, diethylanthryl, and the like.

Any of these radicals can contain one or more alkyl radicals. Any isomeric form of these radicals can be used.

The R group can also be biphenylyl. Also included in the term biphenylyl are the $C_1$ to $C_4$ derivatives such as methylbiphenylyl and ditolyl. The substituents can be one or more as desired in any isomeric position desired. The R group can be attached to the phosphorous o, m, or p to the biphenyl linkage though the ortho position is preferred.

The Z group can be the same as discussed above in connection with R or additionally, a halogen of chlorine or bromine, i.e., an X group. The Z group is preferably a halogen and more preferably the same halogen as the X group. Preferably the halogen is chlorine. While Z can be the same as R, the degree of replacement is not as complete and lower yields are obtained. Yields can be improved by recycling.

The compounds of the present invention are prepared by reacting a pentavalent thiophosphorus halide with a hydrocarbon of the formula:

RH

The hydrocarbons which can be used in the present invention include methane, ethane, propane, butane, pentane, hexane, octane, dodecane, hexadecane, eicosane, cyclopentane, cyclohexane, benzene, naphthalene, anthracene, toluene, xylene, ethylbenzene, propylbenzene, butylbenzene biphenyl, and the like. Isomeric forms of the same compound are also included. These are intended to be included in the definition of the compound. The foregoing compounds are given as illustrative and are in no way considered to be totally inclusive of all the hydrocarbon reactants which can be used in the method of the present invention.

The pentavalent thiophosphorus halide used in the present invention can be depicted by the Formula IV:

$$ZP(S)X_2$$

the radical X is a halogen of chlorine or bromine, and Z is R or X. For most chemical intermediate purposes, the chlorine is preferred. The bromine species can be prepared if desired.

The Z group includes the same moieties listed and discussed above in connection with the R group. Preferably the Z group is a halogen of chlorine or bromine.

Representative pentavalent thiophosphorus halides are thiophosphoryl chloride, thiophosphoryl bromide, mixed phosphorus halides such as dichlorothiophosphoryl bromide and dibromothiophosphoryl chloride, methylphosphonothioic dichloride, ethylphosphonothioic dichloride, isopropylphosphonothioic dichloride, benzylphosphonothioic dichloride, phenylphosphonothioic dichloride, cyclohexylphosphonothioic dichloride, decylphosphonothioic dichloride, hexadecylphosphonothioic dichloride, eicosylphosphonothioic dichloride, naphthylphosphonothioic dichloride, anthracylphosphonothioic dichloride, biphenylylphosphonothioic dichloride, tolylphosphonothioic dichloride, and the like. Also, the thio reactants can be made in situ using the corresponding trivalent phosphorus compound and sulfur. Thus, thiophosphoryl chloride can be prepared in situ from phosphorus trichloride and sulfur. The corresponding alternatives for the other thio reactants would be apparent to one skilled in the art. For economical reasons, the pentavalent phosphorus halide is preferably thiophosphoryl chloride. Mixtures of pentavalent thiophosphorus halides can be used without departing from the scope of the invention.

Stoichiometrically, the present reaction appears to require a ratio of 1 mole of the hydrocarbon (RH) and 1 mole of the pentavalent thiophosphorus halide to prepare one mole of the product and one mole of HX byproduct. For example, a theoretical reaction scheme can be postulated for monosubstitution as follows:

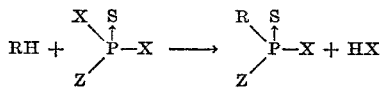

This is only a postulated reaction mechanism and applicants do not intend to limit their process thereto.

While the stoichiometry appears to dictate a molar ratio of 1 mole hydrocarbon to 1 mole thiophosphorus halide, an excess of either reactant can be used. If it is desired to conduct the reaction in the presence of a diluent, excess hydrocarbon can act as the diluent. Excesses of either reactant are generally not desirable as these excesses tend to cause the formation of undesirable byproducts.

The process of the present invention is carried out at elevated temperature and at least at autogenous pressure. Temperatures of between about 200° C. and about 450° C. can be used though temperatures of 250° C. to 380° C. are generally employed. The reactivity of the hydrocarbon compound (RH) largely determines the reaction temperature. Also, and in the aliphatic hydrocarbon series, it is theorized that the positioning of other groups on the carbon having the reactive hydrogen greatly affects the reactivity of the hyrogen. Thus, it has been found that methane which has 4 hydrogen atoms per carbon atom requires more heat to effect reaction than ethane which contains a $CH_3-$ group and three hydrogen atoms per carbon atom. Similarly, it has been found that propane requires less heat to effect reaction than ethane and the reaction appears to proceed through the hydrogen of the $CH_2=$ group, i.e., a secondary hydrogen rather than the $CH_3-$ group. Reaction of tertiary butane requires less heat than propane and the reaction proceeds through the tertiary hydrogen. The relationship for decreasing temperature of reaction can be set forth as follows:

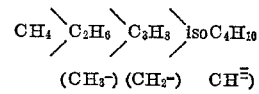

$$(CH_3-) \quad (CH_2-) \quad CH^{\equiv})$$

The temperatures decrease generally across the range of from 360° C. to 250° C. Thus, any hydrocarbon compound which has a tertiary hydrogen atom apparently will tend to react primarily through the tertiary hydrogen. If the temperature of reaction is high enough, the secondary hydrogen apparently will also react. Similarly, if a high enough temperature is used, the primary hydrogen apparently will also react. Thus, selection of temperature can be guided by the type of compound desired. If the hydrocarbon reactant contains a tertiary hydrogen atom, reaction temperatures should be kept low if it is desired to avoid formation of substantial amounts of isomeric forms wherein the reaction proceeds through secondary or primary hydrogen. Similarly, if the reaction proceeds through a secondary hydrogen as in the case of most long chain hydrocarbons having interior $CH_2-$ groups, temperature control can avoid formation of large amounts of isomeric products. Aryl hydrogens are generally equivalent in reactivity. Alkyl substituted aryl groups can be affected by temperature since hydrogens on the aryl ring and the alkyl group are reactive cites. These are general guidelines given to assist in practicing the invention and applicants do not intend to be limited thereby. The basis for the assumption that the reactions are proceeding through any specific hydrogen atom are also theoretical and applicants do not intend to be limited by such statements.

The method of the present invention may conveniently be effected by introducing the individual reactants into a reaction zone capable of withstanding elevated pressure, such as a metal bomb, autoclave, or other pressure vessel, and carrying out the reaction under at least the autogenous pressure developed by the reactants at the reaction temperature. Pressures of up to 200 atmospheres above the autogenous pressure can also be used but are less desirable due to the inconvenience of requiring a pressurization system. The time of reaction may vary over relatively wide limits such as between about 1 to 30 hours, but the preferable reaction time has been found to be between about 5 to 20 hours.

In general, the reaction equipment should be a pressure vessel. The vessel should be equipped with an agitation mechanism (a rocker, vibrator, or stirrer) for best results. Since thiophosphoryl halide is decomposed by water, care is to be taken to avoid the presence of water in the system.

The reaction may be carried out in continuous or batchwise systems as desired. The reaction may also be conducted in the presence of diluents which can be gaseous, liquid, or solid at room temperature though this is less desirable. The amount of diluent if used depends on the specific hydrocarbon (RH) used in the reaction. In general, highly nonreactive hydrocarbons (such as $CH_4$) would use a large excess of $CH_4$. But highly reactive hydrocarbon reactants such as $(CH_3)_3CH$ would not require any excess over and above the stoichiometric amount. The reaction temperature and time are important variables and should be closely controlled as poly-substitutions are possible. Also the pentavalent phosphonic or thiophosphoryl halide, $ZP(S)X_2$ can often be present in excess to act as a diluent.

The products of the reaction are purified by conventional methods such as by fractional distillation of liquids and crystallization or extraction of solid products. The identification of products is achieved by conventional methods, such as elemental analysis, and gas chromatography for purity and mass spectrometer and nuclear magnetic resonance phosphorus NMR and infrared analysis to establish structure.

It is also pointed out that a side reaction may occur when reacting $P(S)X_3$ with RH. Both $RP(S)X_2$ (Z equals X in Formula II) and $R_2P(S)X$ (Z equals R in Formula II), can be formed. Recycling of the $R_2P(S)X$ into the original reaction can convert this material back to $RP(S)X_2$. This reaction is especially apparent when ethane or benzene is the hydrocarbon used as the RH reactant. Increased yields based on materials charged can thus be obtained.

Illustrative of the compounds which can be prepared by the method of the present invention are:

Alkyl:
$$CH_3P(S)Cl_2$$
$$CH_3P(S)Br_2$$
$$C_2H_5P(S)Cl_2$$
$$C_2H_5P(S)Br_2$$
$$C_3H_7P(S)Cl_2$$
$$C_4H_9P(S)Cl_2$$
$$C_5H_{11}P(S)Cl_2$$
$$C_8H_{17}P(S)Br_2$$
$$C_{18}H_{37}P(S)Cl_2$$
$$(CH_3)_3C-CH_2P(S)Cl_2$$
$$CH_3(CH_2)_4-CH-(C_2H_5)CH_2P(S)Cl_2$$

Dialkyl:
$$(CH_3)_2P(S)Cl$$
$$(CH_3)_2P(S)Br$$
$$(C_2H_5)_2P(S)Cl$$
$$(C_2H_5)_2P(S)Br$$
$$(C_4H_9)_2P(S)Cl$$
$$(C_8H_{17})_2P(S)Cl$$
$$(C_8H_{17})_2P(S)Br$$
$$(C_{18}H_{37})_2P(S)Cl$$
$$(C_{18}H_{37})_2P(S)Br$$

Cyclic compounds: Aromatic series, benzene series

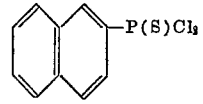

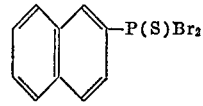

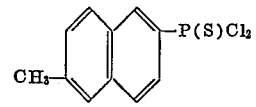

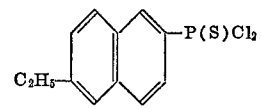

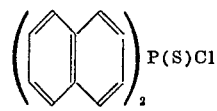

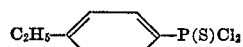

Naphthalene:

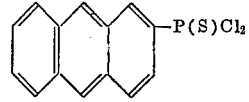

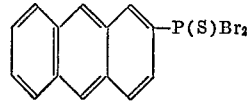

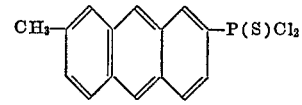

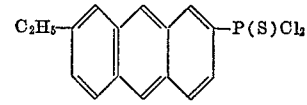

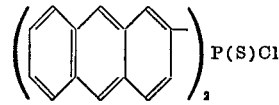

Anthracene series:

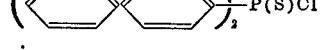

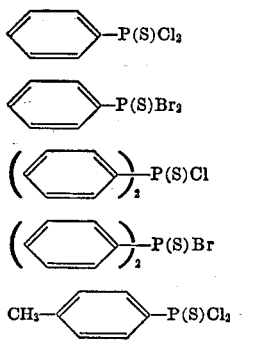

Biphenyl:

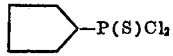

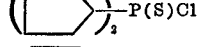

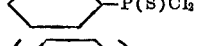

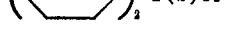

Aliphatic series:

It is to be pointed out that mixtures of product may be prepared using the alkaryl or aralkyl reactants as these materials contain reactive cites on both the aromatic ring and on the aliphatic chain. The product mixture may contain some alkaryl product as well as some aralkyl product. The amount of each in the mixture depends on the conditions of reaction and the relative reactivity of the alkyl moiety vis-a-vis the aryl moiety.

The products of the present invention are monohalides or dihalides of pentavalent thiophosphorus and, therefore, can be subject to all the known reactions which such compounds undergo. The compounds of the invention can be used as intermediates to make insecticides as illustrated by the process for making O-ethyl S-phenyl ethylphosphonothioate as per the following illustrative reaction scheme:

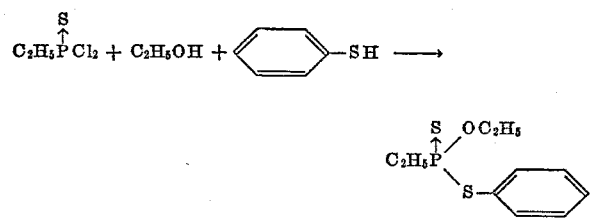

The sodium salts of the acids can also be prepared. Other uses would be obvious to one skilled in the art.

The present invention will be more fully illustrated in the examples which follow.

EXAMPLE 1

Preparation of ethyl phosphonothioic dichloride

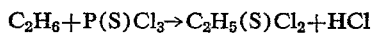

In a 300 milliliter 316 stainless steel autoclave were placed 68 grams P(S)Cl$_3$ (MW 169 or 0.4 mole) and 30 grams ethane (MW 30 or 1 mole). This amount of ethane represents a 0.6 mole or 150% excess over the theoretical of 0.4 mole based on amount of PSCl$_3$ used. The autoclave was heated to 340° C. for 20 hours and rocked for agitation. After cooling to room temperature, the autoclave was vented. The vent gasses were passed through aqueous NaOH traps to remove the HCl byproduct and then through a liquid N$_2$ trap to condense the excess ethane. The aqueous NaOH traps showed 0.36 mole of acid (mainly HCl) had been formed. The weight of material condensed in the liquid N$_2$ traps was 17 grams. It was allowed to warm up to room temperature which caused the material to vaporize. The volume of gas was 13 liters as measured by a wet test meter. This indicates that 0.58 mole of unreacted ethane was recovered of the 0.6 mole excess added.

The weight of liquid poured from the autoclave was 61 grams. Gas chromatograph analysis showed:

| | Percent |
|---|---|
| PCl$_3$ | 6.5 |
| P(S)Cl$_3$ | 0.5 |
| C$_2$H$_5$P(S)Cl$_2$ | 84.0 |
| (C$_2$H$_5$)$_2$P(S)Cl | 9.0 |

The sample was distilled to give 47 grams product. B.P. at 12 mm. was 70–100° C. It had a 91.4% gas chomatograph assay for C$_2$H$_5$P(S)Cl$_2$. Nuclear magnetic resonance spectra confirmed it to be C$_2$H$_5$P(S)Cl$_2$. A second fraction of 4 grams was obtained, B.P. 0.1mm.=100–110°, which gas chromatograph assay showed to be 22.2% C$_2$H$_5$P(S)Cl$_2$ and 77.8% (C$_2$H$_5$)$_2$P(S)Cl. The residue was 3.5 grams. The yield of C$_2$H$_5$P(S)Cl$_2$ is 70% theoretical with 0.027 mole recovered PCl$_3$ (6.75% of starting phosphorus in P(S)Cl$_3$).

EXAMPLE 2

The process of Example 1 was repeated and the gas chromatograph analysis of the 61 grams liquid poured from the autoclave was as follows.

| Component: | Area percent |
|---|---|
| PCl$_3$ | 8.4 |
| P(S)Cl$_3$ | 1.3 |
| C$_2$H$_5$P(S)Cl$_2$ | 83.2 |
| (C$_2$H$_5$)$_2$P(S)Cl | 7.1 |

EXAMPLE 3

The process of Example 1 was repeated except reaction time was decreased to 10 hours. 59.8 grams of liquid from bomb were obtained which had a gas chromatograph analysis of:

| Component: | Area percent |
|---|---|
| PCl$_3$ | 8.3 |
| P(S)Cl$_2$ | 0.7 |
| C$_2$H$_5$P(S)Cl$_2$ | 83.2 |
| (C$_2$H$_5$)$_2$P(S)Cl | 5.1 |

EXAMPLE 4

In a 300 milliliter autoclave made of 316 stainless steel were placed 69 grams of n-hexane (0.8 mole) and 68 grams of P(S)Cl$_3$ (0.4 mole). Excess n-hexane was used to prevent excessive byproduct formation. The reaction was heated at 280° C. with gentle rocking for agitation. The autoclave was vented when cool and 0.405 mole of byproduct HCl was found in the vent gas. The liquid poured from the autoclave weighed 116 grams. The product was isolated by distillation which gave 45 grams of unreacted n-hexane and 38 grams of product having a B.P. at 0.5 millimeter of Hg pressure of 75° C.

*Analysis.*—Found (percent): P, 14.6; Cl, 32.5. Theoretical for C$_6$H$_{13}$P(S)Cl$_2$ (percent): P, 14.1; Cl, 32.4.

$$n_D{}^{25}=1.5262$$

Nuclear magnetic resonance spectra analysis indicates the product contains several isomers.

EXAMPLE 5

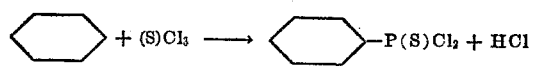

In a 300 milliliter 316 stainless steel autoclave were placed 67 grams cyclohexane (0.8 mole or 100% excess) and 68 grams (P(S)Cl$_3$ (0.4 mole). The autoclave was heated to 280° C. for 10 hours with gentle rocking for agitation. After cooling the autoclave was vented and the vent was contained 0.43 mole HCl. The liquid poured from the autoclave weighed 115 grams. The product was isolated by distillation which gave 36 grams of unreacted cyclohexane and 40 grams of C$_6$H$_{11}$P(S)Cl$_2$ having a B.P. at 0.2 millimeter of Hg pressure of 90–92° C.

*Analysis.*—Found (percent): P, 14.6; Cl, 33.1. Theoretical for C$_6$H$_{11}$P(S)Cl$_2$ (percent): P, 14.3; Cl, 32.8.

$$n_D{}^{25}=1.5623$$

Nuclear magnetic resonance spectra analysis indicated the product to be cyclohexylphosphonothioic dichloride.

EXAMPLE 6

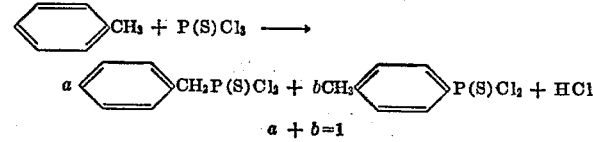

$a + b = 1$

In a 300 milliliter 316 stainless steel autoclave were placed 73.5 grams toluene (0.8 mole or 100% excess) and 68 grams P(S)Cl$_3$ (0.4 mole). The autoclave was heated at 280° C. for 10 hours with gentle rocking for agitation. After cooling the autoclave was vented and 0.405 mole of byproduct HCl was found in the vent gas.

The weight of liquid poured from the autoclave was 122 grams. The product was isolated by distillation which gave 41 grams unreacted toluene and 36 grams product having a B.P. at 0.1 millimeter Hg pressure of 85–95° C.

*Analysis.*—Found (percent): P, 12.8; Cl, 29.1. Theoretical for $C_7H_7P(S)Cl_2$ (percent): P, 13.8; Cl, 31.5.

$$n_D^{25}=1.6087$$

Nuclear magnetic resonance spectra analysis shows the product is a mixture of isomers in which the phosphorus is attached to the methyl group of toluene and also on the benzene ring in about 1:1 ratio.

EXAMPLE 7

$$C_2H_5P(S)Cl_2 + C_2H_6 \rightarrow (C_2H_5)_2P(S)Cl + HCl$$

In a 300 milliliter 316 stainless steel autoclave were placed 65.2 grams $C_2H_5P(S)Cl_2$ (0.4 mole) and 24.0 grams ethane. The autoclave was heated to 340° C. for 20 hours. After cooling the autoclave was vented. Besides the unreacted ethane there was 0.17 mole of byproduct HCl in the vent gas (43% the theoretical amount). The weight of liquid poured from the autoclave was 45 grams. Some solid material remained in the autoclave. Vapor phase chromatograph analysis showed that the crude product contained 66% unreacted $C_2H_5P(S)Cl_2$ and 32%

$$(C_2H_5)_2P(S)Cl$$

The product was isolated by distillation to give 8.0 grams product.

$$n_D^{25}=1.5306$$

B.P. at 12 millimeters Hg pressure=95° C.

Nuclear magnetic resonance spectra analysis confirms the structure of the product to be diethylphosphinothioic chloride.

EXAMPLE 8

$$CH_4 + P(S)Cl_3 \rightarrow CH_3P(S)Cl_2 + HCl$$

In a 300 milliliter 316 stainless steel autoclave were placed 68 grams $P(S)Cl_3$ (0.4 mole) and 16 grams methane (0.6 mole or a 50% excess). The autoclave was heated at 340° C. for 5 hours. After cooling the autoclave was vented and along with unreacted methane there was 0.19 mole of byproduct HCl. The weight of liquid poured from the autoclave was 55 grams. Vapor phase chromatograph analysis showed that the liquid contained 14% $CH_3P(S)Cl_2$ along with unreacted $P(S)Cl_3$ and $PCl_3$.

EXAMPLE 9

$$C_2H_6 + PCl_3 + S \rightarrow C_2H_5P(S)Cl_2 + HCl$$

In a 300 milliliter 316 stainless steel autoclave were placed 55 grams $PCl_3$ (0.4 mole), 12.8 grams sulfur (0.4 gram atom) and 18 grams ethane (0.6 mole or 50% excess). The autoclave was heated to 340° C. over a 2 hour period and kept at 340° C. for five hours. After cooling the autoclave was vented and along with unreacted ethane there was 0.36 mole of byproduct HCl. The weight of liquid poured from the autoclave was 60 grams. Vapor phase chromatograph analysis showed the following:

| | Percent |
|---|---|
| $PCl_3$ | 14.0 |
| $P(S)Cl_3$ | 3.1 |
| $C_2H_5P(S)Cl_2$ | 75.8 |
| $(C_2H_5)_2P(S)Cl$ | 2.3 |
| High boilers | 4.9 |

EXAMPLE 10

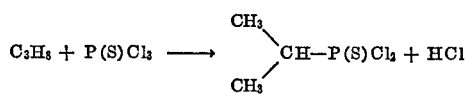

In a 300 milliliter 316 stainless steel autoclave were placed 68 grams $P(S)Cl_3$ (0.4 mole) and 26.4 grams propane. The autoclave was heated to 280° C. for 5 hours. After cooling the autoclave was vented and 0.304 mole of byproduct HCl were found. The weight of liquid poured from the autoclave was 62 grams. Vapor phase chromatographic analysis showed the following:

| | Percent |
|---|---|
| $PCl_3$ | 15 |
| $P(S)Cl_3$ | 30 |
| $C_3H_7P(S)Cl_2$ | 55 |

The product was isolated by distillation which gave 21 grams of product having a B.P. at 12 millimeters Hg pressure of 85–95° C.

$$n_D^{25}=1.5333$$

Nuclear magnetic resonance spectra analysis shows the product to be a pure isomer of iso-$C_3H_7P(S)Cl_2$.

EXAMPLE 11

$$(CH_3)_3CH + P(S)Cl_3 \rightarrow (CH_3)_3CP(S)Cl_2 + HCl$$

In a 300 milliliter 316 stainless steel autoclave were placed 68 grams $P(S)Cl_3$ (0.4 mole) and 35 grams isobutane (0.6 mole). The autoclave was heated at 240°–250° C. for 10 hours. After cooling the autoclave was vented and the vent gas contained 0.36 mole HCl. The liquid poured from the autoclave weighed 63 grams. The unreacted materials were distilled off and the product sublimed at a bath temperature of 70–90° C. at 12 millimeters of Hg pressure. The yield of sublimed product was 15 grams.

*Analysis.*—Found (percent): P, 16.1; Cl, 36.0. Theoretical for $C_4H_9P(S)Cl_2$ (percent): P, 16.3; Cl, 37.2.

$$M.P.=172–174°$$

Nuclear magnetic resonance spectra confirms the $(CH_3)_3CP(S)Cl_2$ structure.

EXAMPLE 12

$$(CH_3)_3CH + P(S)Cl_3 \rightarrow a(CH_3)_3CP(S)Cl_2$$
$$+ b(CH_3)_2CHCH_2P(S)Cl_2 + HCl$$
$$a+b=1$$

The reaction of Example 11 run at reaction temperature of 290° C. for 5 hours gives a mixture of $$(CH_3)_3CP(S)Cl_2 + (CH_3)_2CHCH_2P(S)Cl_2$$

The product is a liquid.

*Analysis.*—Found (percent): P, 15.6–16.1; Cl, 38. Theoretical for $C_4H_9P(S)Cl_2$ (percent): P, 16.3; Cl, 37.2.

EXAMPLE 13

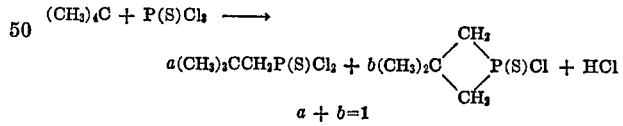

In a 300 milliliter 316 stainless steel autoclave were placed 101 grams $P(S)Cl_3$ (0.6 mole) and 43 grams neopentane (0.6 mole). The autoclave was heated at 320° C. for 10 hours. After cooling the autoclave was vented and there was 0.51 mole byproduct HCl. The weight of liquid poured from the autoclave was 94 grams. The product was isolated by distillation which gave 23 g. of unreacted $P(S)Cl_3$ and neopentane along with some $PCl_3$. The next fraction had a B.P. at 12 millimeters Hg pressure of 70–80° C. and weighed 21 grams. Nuclear magnetic resonance spectra analysis showed this to be mainly

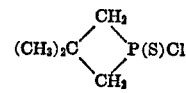

The $(CH_3)_3CCH_2P(S)Cl_2$ had a B.P. at 12 millimeters Hg pressure of 90–100° C. and weighed 20 grams. Nuclear magnetic resonance spectra confirmed the structure as neopentylphosphonothioic dichloride.

$$n_D^{25}=1.5237$$

EXAMPLE 14

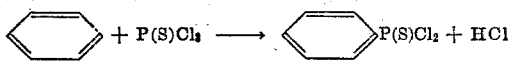

In a 300 milliliter 316 stainless steel autoclave were placed 84.6 grams P(S)Cl₃ (0.5 mole) and 46.5 grams benzene (0.6 mole). The autoclave was heated at 320° C. for 10 hours. After cooling the autoclave was vented and 0.42 mole HCl byproduct found. The liquid poured from the autoclave weighed 110 grams. Vapor phase chromatograph analysis showed the following:

| | Percent |
|---|---|
| PCl₃ | 10.7 |
| C₆H₆ | 35.8 |
| P(S)Cl₂ | 9.6 |
| P(S)Cl₂ | 43.9 |

The product was isolated to give 56 grams product.

$$n_D^{25} = 1.6225$$

Nuclear magnetic resonance spectra analysis confirms the structure of the product.

There were also recovered 24 grams of a material having a boiling point higher than the boiling point of $C_6H_5P(S)Cl_2$ product. It consisted mainly of $$(C_6H_5)_2P(S)Cl$$

Recycling of this material in the same reaction described above increases the yield of $C_6H_5P(S)Cl_2$ to 66 grams.

The present invention is defined in the claims which follow.

What is claimed is:

1. A method for preparing compounds of the formula:

wherein R is a C₁ to C₂₀ alkyl radical, cycolalkyl of 5-6 carbons in the ring and the C₁-C₄ alkyl substituted derivative thereof, an aralkyl radical of up to 2 fused rings, the alkyl portion having from 1 to 20 carbon atoms, an aryl radical of up to 3 fused rings and the C₁-C₄ alkyl derivatives thereof, and biphenylyl, and the C₁-C₄ alkyl derivatives thereof, X is a halogen of chlorine or bromine, and Z is either R or X, comprising reacting, under at least an autogenous pressure at a temperature of from about 200° C. to about 450° C. an aliphatic or aromatic hydrocarbon of the formula:

RH wherein R is as defined above with a pentavalent phosphorus halide of the formula:

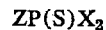

wherein X and Z are as defined above.

2. The method as recited in claim 1 wherein Z is halogen.

3. The method as recited in claim 1 wherein Z and X are chlorine.

4. The method as recited in claim 1 wherein R is a C₁-C₆ alkyl.

5. The method as recited in claim 1 wherein said reaction is conducted at a temperature of from about 250° C. to about 380° C.

6. The method as recited in claim 1 wherein the pentavalent phosphorus halide is thiophosphoryl chloride.

7. The method as recited in claim 6 wherein said thiophosphoryl chloride is formed in situ from phosphorus trichloride and sulfur.

8. The method of claim 1 wherein said hydrocarbon is ethane.

9. The method of claim 1 wherein any byproduct RZP(S)X, wherein Z is R, is recycled for further reaction to produce RZP(S)X wherein Z equals X.

References Cited

Schmidt et al.: Angew. Chem. Internat. Edit., vol. 9 (1970), No. 6.

LORRAINE A. WEINBERGER, Primary Examiner

R. D. KELLY, Assistant Examiner